United States Patent

Kido et al.

[11] Patent Number: 5,917,688
[45] Date of Patent: Jun. 29, 1999

[54] CENTRIFUGAL APPARATUS WITH PROTECTION

[75] Inventors: Nobuharu Kido; Satoshi Numata; Koji Unno, all of Hitachinaka, Japan

[73] Assignee: Hitachi Koki Co., Ltd., Japan

[21] Appl. No.: 08/948,413

[22] Filed: Oct. 9, 1997

[30] Foreign Application Priority Data

Oct. 18, 1996 [JP] Japan .................................... 8-276522
Mar. 14, 1997 [JP] Japan .................................... 9-060875

[51] Int. Cl.[6] ........................................................ H02H 3/00
[52] U.S. Cl. ............................ 361/51; 361/23; 318/465; 388/924
[58] Field of Search .............................. 361/23, 33, 51; 318/465, 807; 388/814, 820, 832, 924; 73/512

[56] References Cited

U.S. PATENT DOCUMENTS

| | | | |
|---|---|---|---|
| 3,636,545 | 1/1972 | Boyd et al. ............................ | 364/565 |
| 4,700,117 | 10/1987 | Giebeler et al. ........................ | 388/814 |
| 4,827,197 | 5/1989 | Giebeler .................................. | 318/3 |
| 4,839,589 | 6/1989 | Heinle ................................... | 324/166 |
| 4,841,202 | 6/1989 | Dishner et al. ......................... | 318/14 |
| 4,914,361 | 4/1990 | Tajima et al. ............................ | 318/254 |
| 5,383,838 | 1/1995 | Cheng et al. ............................ | 494/10 |
| 5,726,881 | 3/1998 | Inaniwa et al. ......................... | 364/184 |

*Primary Examiner*—Jeffrey Gaffin
*Assistant Examiner*—Kim Huynh
*Attorney, Agent, or Firm*—Parkhurst & Wendel, L.L.P.

[57] ABSTRACT

A centrifugal apparatus is disclosed which includes a rotor, a motor, a speed signal generator, including a disc having alternate reflective and non-reflective stripes, for generating a rotating speed signal of the rotor, a microprocessor (mpu), an analog processing circuit. The rotating speed of the rotor is judged by both the microprocessor and the analog processing circuit including a F/V converter and a voltage comparator independently, so that an overspeed condition is prevented. The mpu may further detect a motor rotating speed and compare the variation in the rotating speed signal of the rotor and the rotating speed of the motor. If the difference exceeds a reference, the mpu stops the rotor. Another disc of which reflective strip is replaced by a non reflective strip may be provided to the rotor and a pulse compensation circuit for compensating the lack of the pulse in the rotating speed signal is also provided. This type of the disc is provided to distinguish the types of these rotors. The pulse compensation circuit detects the lack of the pulse and then, generates and adds a pulse to the rotating speed signal.

5 Claims, 9 Drawing Sheets

CENTRIFUGAL APPARATUS WITH PROTECTION

BACKGROUND OF THE INVENTION

1. Field of the Invention

This invention relates to a centrifugal apparatus with protection.

2. Description of the Prior Art

A centrifugal apparatus with protection having a rotor, a rotary speed sensor, a drive circuit for driving the rotor in accordance with the rotary speed sensor and a reference frequency signal, and a microprocessor for detecting an overspeed condition in accordance with the rotary speed sensor and for controlling a supply power to the drive circuit for protection is known.

SUMMARY OF THE INVENTION

The aim of the present invention is to provide an improved centrifugal apparatus with protection.

According to the present invention, a centrifugal apparatus is provided, which comprises: a rotor for containing a sample; a motor coupled to said rotor; a rotating speed signal generation circuit for generating a rotating speed signal in accordance with a rotation of the rotor; a driving circuit for driving the motor in accordance with the rotating speed signal to a target rotating speed; a digital processing circuit for judging whether a rotating speed of the rotor exceeds a first predetermined rotating speed from the rotating speed signal and controlling the driving circuit to stop rotating the motor when the rotating speed exceeds the first predetermined rotating speed; and an analog processing circuit for Judging whether the rotating speed of the rotor exceeds a second predetermined rotating speed corresponding to the first predetermined rotating speed from the rotating speed signal and controlling the driving circuit to stop rotating the motor when the rotating speed exceeds the second predetermined rotating speed, wherein the digital processing circuit and the analog processing circuit operate independently each other.

In the centrifugal apparatus the rotating speed signal generating circuit comprises: a disc, provided to the rotors having a circumference pattern including a plurality of optically alternate stripes; and an optical sensors arranged to confront the circumference pattern, for detecting optical information from the circumference pattern and generating the rotating speed signal In the centrifugal apparatus, the digital processing circuit comprises a microprocessor for detecting a frequency of the rotating signal and Judging the rotating speed by comparing the detected frequency with a predetermined value as the first predetermined rotating speed, and the analog processing circuit comprises: an analog frequency-to-voltage converting circuit for converting the frequency of the rotating speed signal to a voltage signals and an analog voltage comparator for comparing the voltage signal with a predetermined voltage as the second predetermined rotating speed The centrifugal apparatus may further comprise a motor rotating speed signal generating circuit for generating a motor rotating speed signal indicative of a rotating speed of the motor, wherein the digital processing circuit further comprises: a first detection portion for detecting a first frequency variation of the rotating speed signal per unit interval; a second detection portion for detecting a second frequency variation of the motor rotating speed signal per the unit interval; and a difference detection portion for detecting a difference between the first and second frequency variations; and a control portion responsive to the difference detection portion for controlling the driving circuit to stop rotating the motor when the difference exceeds a reference.

Moreover, the centrifugal apparatus may further comprises a motor rotational speed signal generating circuit for generating a motor rotating speed signal indicative of a rotating speed of the motor, wherein the digital processing circuit further comprises: a first detection portion for detecting a cycle variation of the rotating speed signal; a second detection portion for detecting a second cycle variation of the motor rotating speed signal; and a difference detection portion for detecting a difference between the first and second cycle variations; and a control portion responsive to the difference detection portion for controlling the driving means to stop rotating the motor when the difference exceeds a reference.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
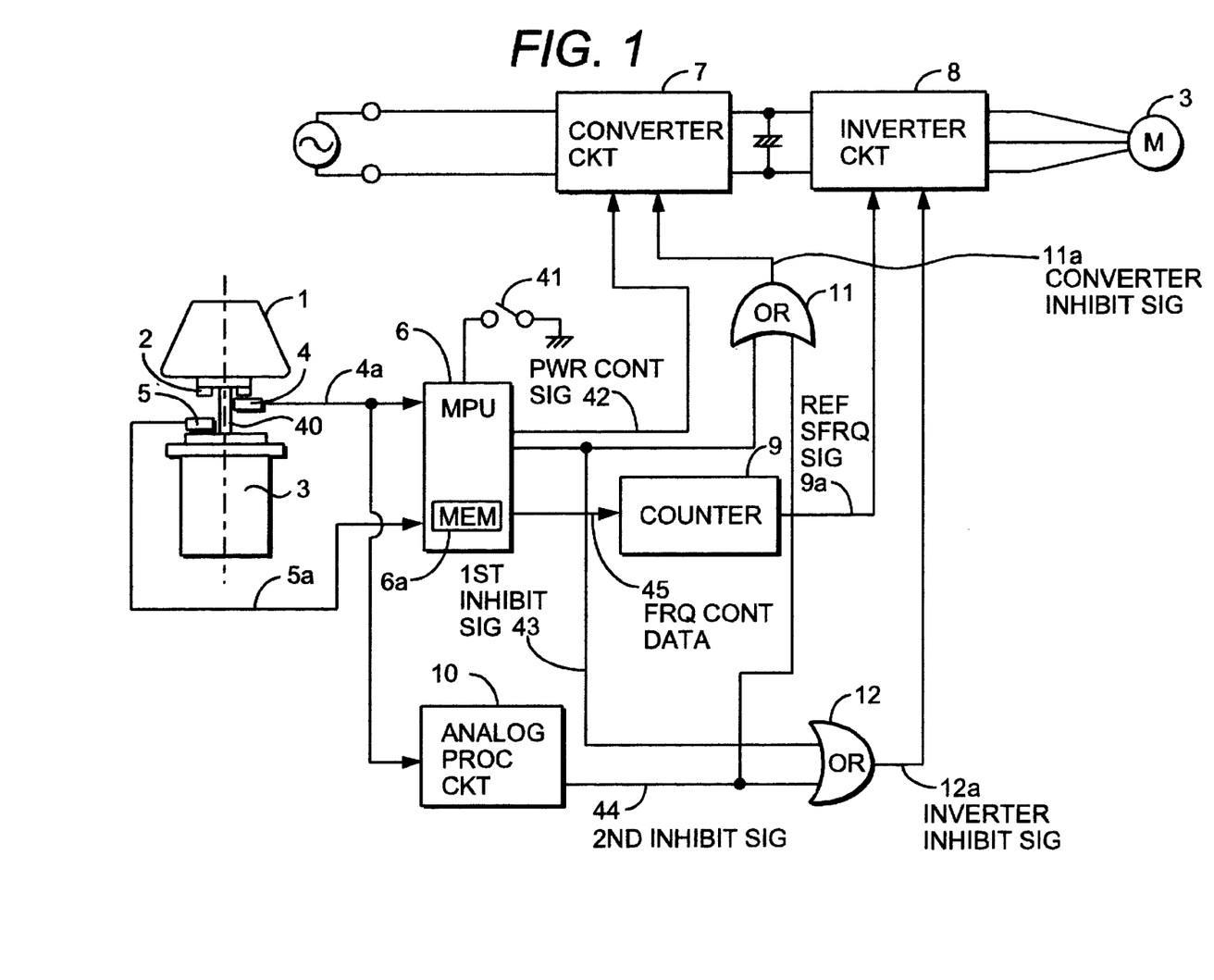
FIG. 1 is a block diagram of a centrifugal apparatus of a first embodiment.

FIG. 1 is a block diagram of a centrifugal apparatus of a first embodiment.

The centrifugal apparatus of the first embodiment comprises a rotor 1 for containing a sample, a motor 3, a shaft 40 for coupling the rotor 1 to the motor 3, a disc 2 provided to the rotor 1 having a position signal pattern in the circumference direction, a rotor rotating speed sensor 4 for generating a rotor rotating speed signal (rotor position signal) 4a in accordance with a rotation of the rotor 19 a motor rotating speed sensor 5 for generating a motor rotating speed signal (motor position signal) 5a with rotation of the motor 3, a drive circuit including a converter circuit 7 for generating a driving power from an ac supply power in accordance with power control signal 42 and an inverter circuit 8 for supplying drive current signals to the motor 3 from the driving power in accordance with a reference frequency signal 9a, a microprocessor (mpu) 6 responsive to the rotor rotating speed signal 4a and the motor rotating speed signal 5a for controlling the converter circuit 7 and the inverter circuit 8 and generating a first inhibit signal, an analog processing circuit 10 responsive to the rotor rotating speed signal 4a for generating a second inhibit signal 44, a programmable counter 9 for generating the reference frequency signal 9a in accordance with frequency control data 45 from the microprocessor 6, an OR gate 11 for supplying the first inhibit signal 43 or the second inhibit signal 44 to the converter circuit 7 as a converter inhibit signal 11a, an OR gate 12 for supplying the first inhibit signal 43 or the second inhibit signal 44 to the inverter circuit 8 as an inverter inhibit signal 12a.

Figure 2:
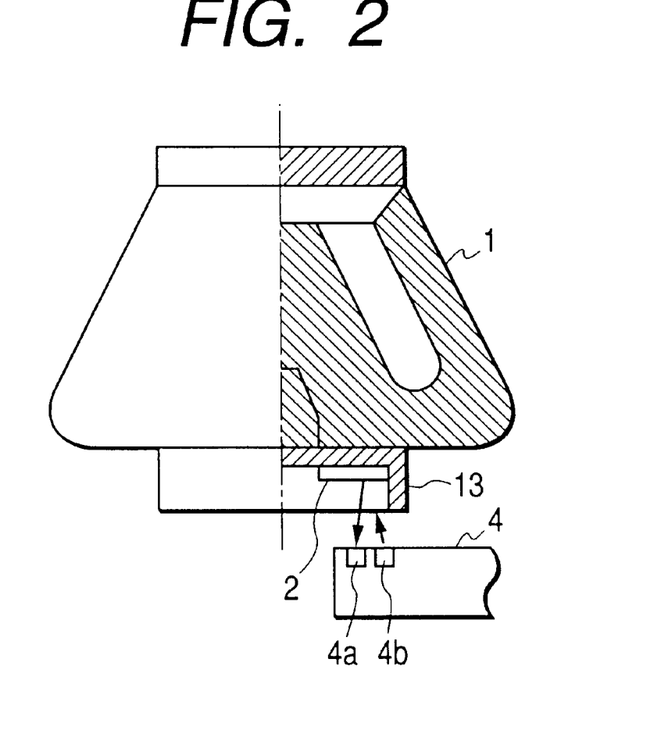
FIG. 2 is a side view, partially a cross-sectional view, of a rotor and the rotor rotating speed sensor shown in FIG. 1.

FIG. 2 is a side view, partially a cross-sectional view, of the rotor 1 and the rotor rotating speed sensor 4 shown in FIG. 1.

Figure 3:
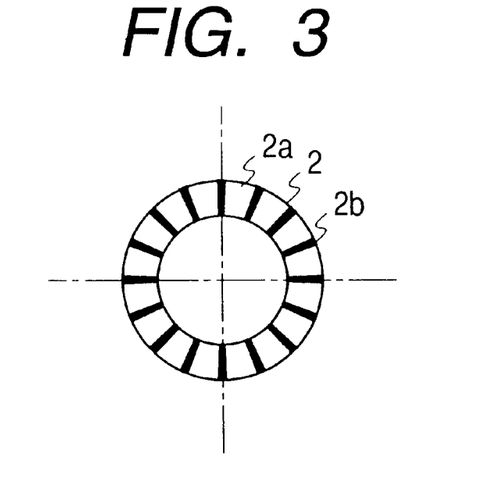
FIG. 3 is a plan view of a disc shown in FIG. 2.

FIG. 3 is a plan view of the disc 2 shown in FIG. 2.

The disc 2 is fixed to a bottom of the rotor 1 and has the position signal pattern in its circumference direction including reflective stripes 2a and non-reflective stripes 2b alternately, wherein the reflective strip 2a is wider than the non-reflective stripes 2b in the case of FIG. 3. A photo diode 4b of the rotor rotating speed sensor 4 emits light to the disc 2 and receives reflected light by an optical sensor 4c and generates the rotor rotating speed signal 4a. In this embodiment, the limit frequency of the rotor rotating signal 4a corresponding to the allowable maximum rotating speed of the rotor 1 is 15.5 KHz. Therefore, if a rotor of which allowable rotor rotating speed is 60000 rpm is attached, the disc has fifteen reflective portions 2a (the frequency becomes 15 KHz). If a rotor of which allowable rotor rotating speed is 70000 rpm is attached, the disc has thirteen reflective portions 2a (the frequency becomes 15.2 KHz). Therefore, the actual allowable rotating speed is controllable in accordance with the number of the reflective stripes 2a on the disc 2.

In response to a start command from a start switch 41, the microprocessor 6 supplies the power control signal 42 to the converter circuit 7 in accordance with the rotor rotating speed signal. The converter circuit 7, including a rectifying circuit, generates the drive power through the pulse width modulation method in accordance with the power control signal 42 from the microprocessor 6. The converter circuit 7 is further responsive to the converter inhibit signal 11a from the OR gate 11. When the converter inhibit signal 42 is H, the converter circuit 7 supplies no drive power to the inverter 8. The microprocessor 6 supplies the frequency control data 45 to the programmable counter 9. The programmable counter 9 generates the reference frequency signal 9a in accordance with the frequency control data 45. The inverter circuit 8 generates the drive current signals from the drive power from the converter circuit 7 and the reference frequency signal 9a from the programmable counter 9. The inverter circuit 8 is further responsive to the inverter inhibit signal 12a and supplies no drive current signal to the motor 3 when the inverter inhibit signal 12a is H.

The microprocessor 6 generates the frequency control data 45 to obtain the target rotating speed of the rotor 1 in accordance with the rotor rotating speed signal 4a from the rotor rotating speed sensor 4. The microprocessor 6 generates the first inhibit signal 43 when the microprocessor 6 detects that the frequency of the rotor rotating speed signal 4a exceeds a first predetermined value.

Figure 4:
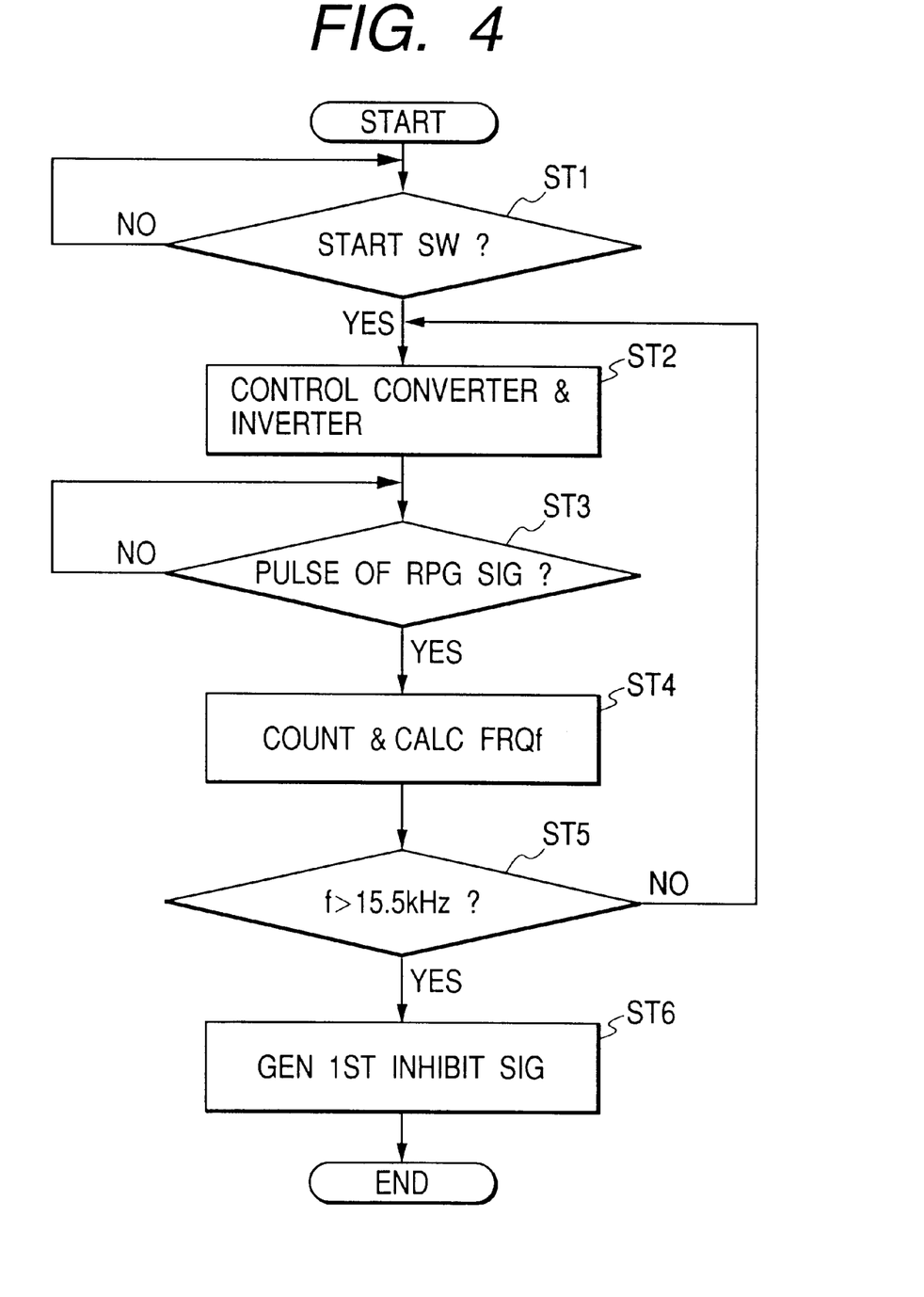
FIG. 4 depicts a flow chart of the first embodiment showing an operation of a microprocessor shown in FIG. 1.

FIG. 4 depicts a flow chart of the first embodiment showing the operation of the microprocessor 6. The microprocessor 6 includes a timers a reference clock signal generator (both not shown) for generating reference clock signals therein to measure time interval and to determine a timing such as timer interruption.

In step st1, in response to the start switch 41, the microprocessor 6 controls the converter circuit 7 and controls the inverter circuit 8 through the programmable counter 9 in step st2. In the following step st3, the microprocessor 6 waits a pulse of the rotor rotating speed signal 4a. When the pulse of the rotor rotating speed signal 4a arrives, the microprocessor 6 counts up the pulse and obtains a frequency f of the rotor rotating speed signal 4a in step st4. In the following step st5, the microprocessor 6 judges whether the frequency f exceeds the predetermined values for examples 15.5 KHz. If the frequency f exceeds the predetermined value, the microprocessor 6 generates the first inhibit signal 43 in step st6. If the frequency f does not exceed the predetermined values processing returns to step st2 to control the converter circuit 7 and the inverter circuit 8.

The analog processing circuit 10 generates the second inhibit signal 44 from the rotor rotating speed signal 4a when the analog processing circuit 10 detects that the frequency f of the rotor rotating signal exceeds a second predetermined value corresponding to the first predetermined value.

Figure 5:
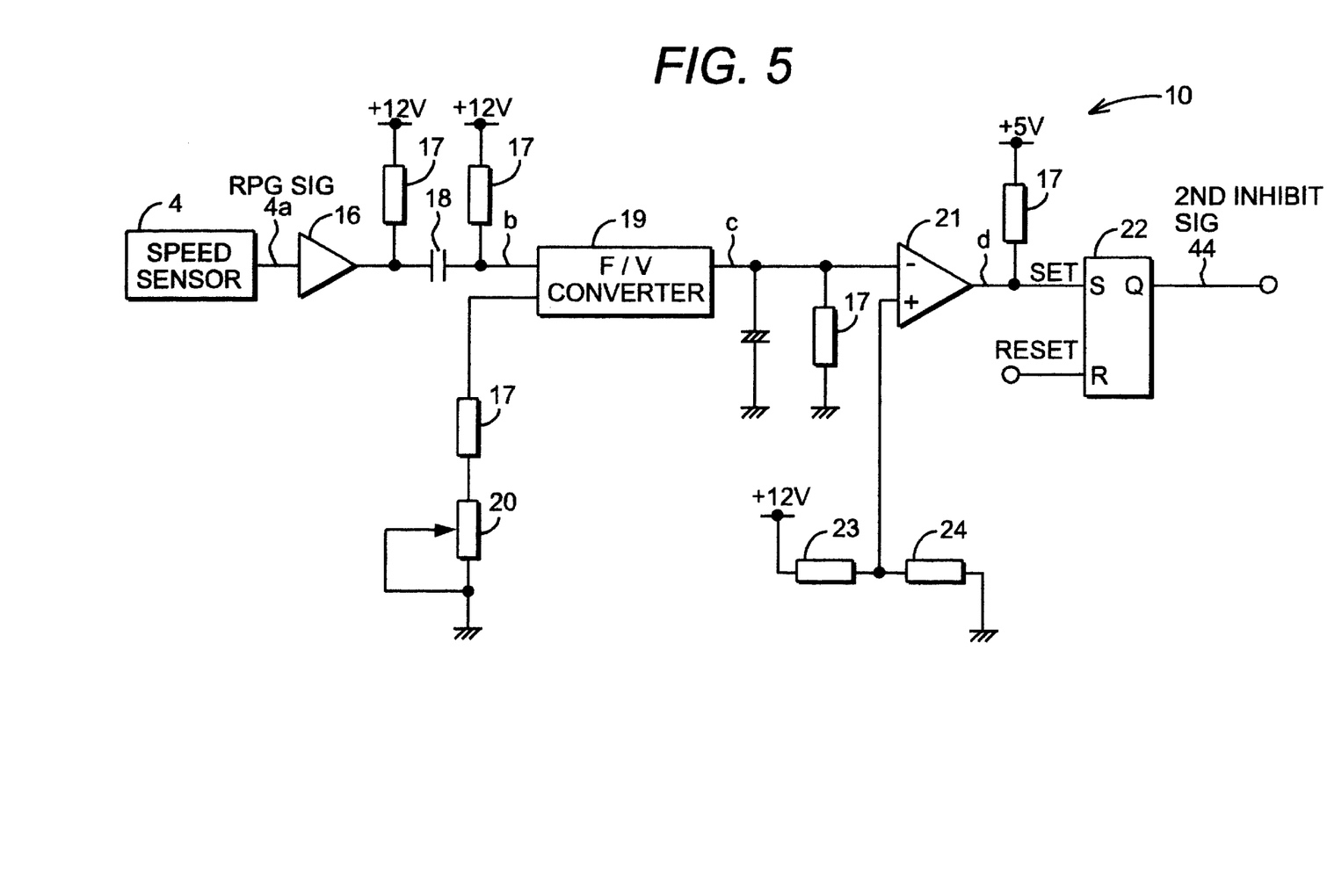
FIG. 5 is a block diagram of the analog processing circuit shown in FIG. 1.

FIG. 5 is a block diagram of the analog processing circuit 10 shown in FIG. 1.

The analog processing circuit 10 comprises a buffer amplifier 16 responsive to the rotor rotating speed signal 4a, a capacitor 18 for generating a differential signal b from an output of the buffer amplifier 16 the frequency-to-voltage (F/V) converter 19 for converting a frequency of the differential signal b to a voltage signal c, a comparator 21 for comparing the voltage signal c with a reference voltage provided by resistors 23 and 24, an RS flip flop circuit 22 for outputting and holding the second inhibit signal 44 in response to an output d of the comparator 21.

The F/V converter 19 generates the voltage signal having a voltage of 9.8 V by a potentiometer 20 when the frequency f of the rotor rotating speed signal 4a is 15.5 KHz. The reference voltage is also 9.8 V which corresponds to the first predetermined value.

When the frequency f of the rotor rotating speed signal 4a exceeds 15.5 KHz, the RS flip flop 22 generates the second inhibit signal 44 showing H level.

The analog processing circuit 10 generates the second inhibit signal 44 to stop rotating the motor 3 by controlling the converter circuit 7 and the inverter circuit 8 independently of the microprocessor 6.

It is a possibility that the microprocessor 6 as a digital processing circuit may be inoperable due to a noise or the like. However, the analog processing circuit 10 is further provided, so that the overspeed protection is effected surer.

The microprocessor 6 further detects abnormal conditions of the rotor 1.

Figure 6:
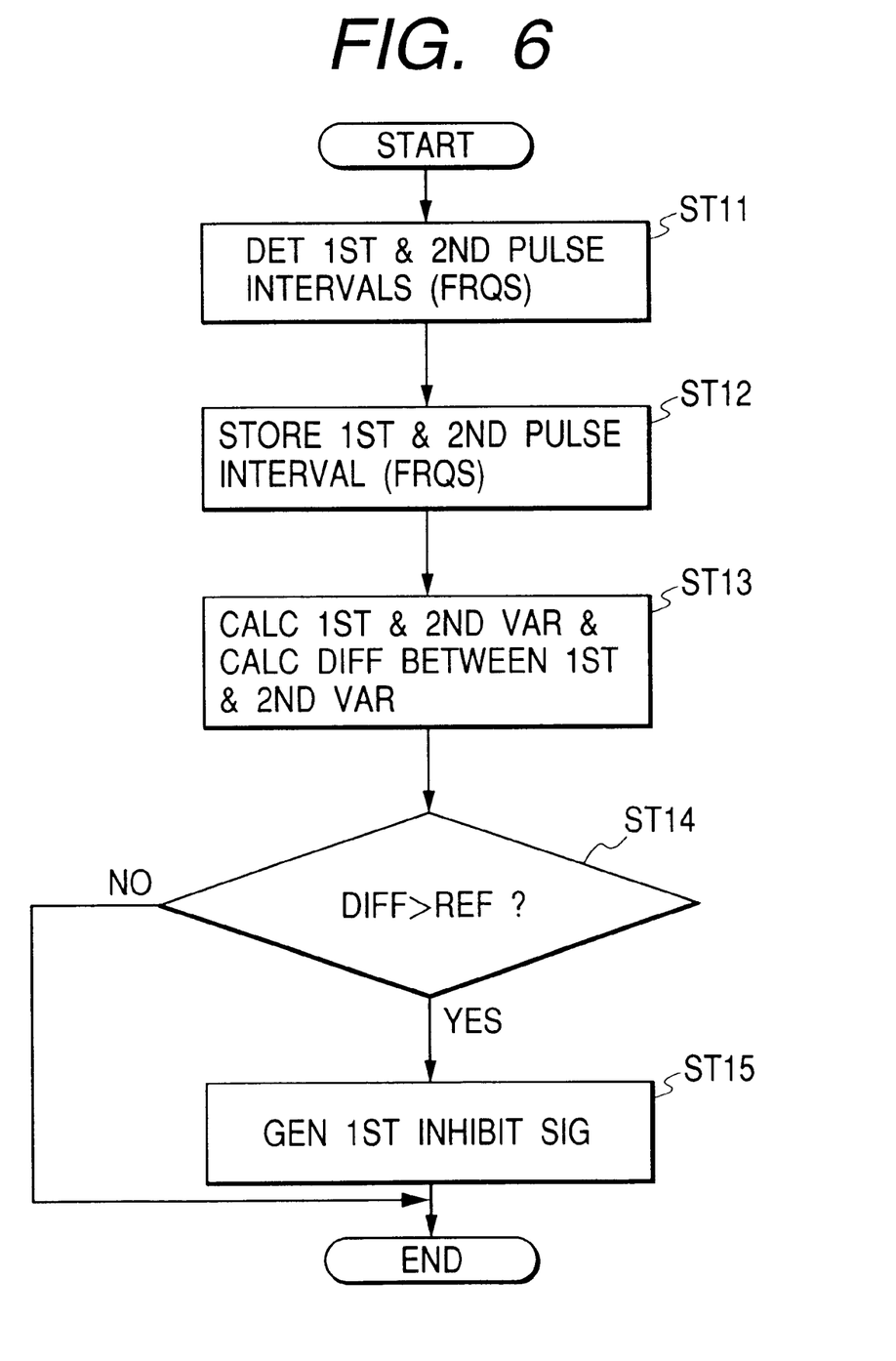
FIG. 6 depicts a flow chart of the first embodiment showing another operation of the microprocessor shown in FIG. 1.

FIG. 6 depicts a flow chart of the first embodiment showing another operation of the microprocessor 6 shown in FIG. 1.

The microprocessor 6 executes this processing periodically, that is, executes it in response to a timer interruption, so that the processing in FIG. 4 and this processing are executed in a time-division multiplexed manner.

The microprocessor 6 detects a first pulse interval (cycle or frequency) in the rotor rotating speed signal 4a and detects a second pulse interval (cycle or frequency) in the motor rotating speed signal 5a in step st11. The microprocessor 6 stores the first and second pulse intervals in a memory 6a in step st12. The microprocessor 6 calculates a first variation between the present pulse interval (cycle or frequency) and the previous pulse interval (cycle or frequency) in the rotor rotating signal 4a and calculates a second variation between the present pulse interval (cycle or frequency) and the previous pulse interval (cycle or frequency) in the motor rotating signal 5a. Further, the microprocessor 6 calculates a difference between the first and second variations in step st13 and judges whether the difference exceeds a reference which is an allowable difference value in step st14. If the difference exceeds the reference, the microprocessor 6 also generates the first inhibit signal 42 to stop rotating the motor 3 by controlling the converter circuit 7 and the inverter circuit 8 in step st15, so that the abnormal condition of the rotating rotor such as an oscillation condition, an non-periodical variation or the like can be detected and the centrifugal apparatus is protected from the abnormal condition. If the difference does not exceeds the reference, processing ends.

In this embodiment, the abnormal condition is detected in addition of the detection of the overspeed condition. However, a centrifugal apparatus detecting only the abnormal condition for protection may be provided. Such a centrifugal apparatus comprises: the rotor 1 for containing a sample; the motor 3 coupled to the rotor 1; the rotor rotating speed sensor 4 for generating the rotor rotating speed signal 4a in accordance with rotating of the rotor 1; the motor rotating speed sensor 5 for generating the motor rotating speed signal 5a in accordance with rotation of the motor 3; the driving circuit, including the converter circuit 7 and the inverter circuit 8, for driving the motor 3 in accordance with the rotating speed signal of the rotor 1 or the motor 3 to a target rotating speed; the memory 6a of the microprocessor 6 for storing the first and second rotating speed (st12); a detection step st13 for detecting a first variation in the rotor rotating speed signal per a unit intervals detecting a second variation in the motor rotating speed signal per the unit interval, and detecting a deference between the first and second variations; a control steps st14 and st15 responsive to the detection step st13 for controlling the driving circuit to stop rotating of the motor 3 when the difference exceeds a reference.

A second embodiment of the invention will be described.

Figure 7:
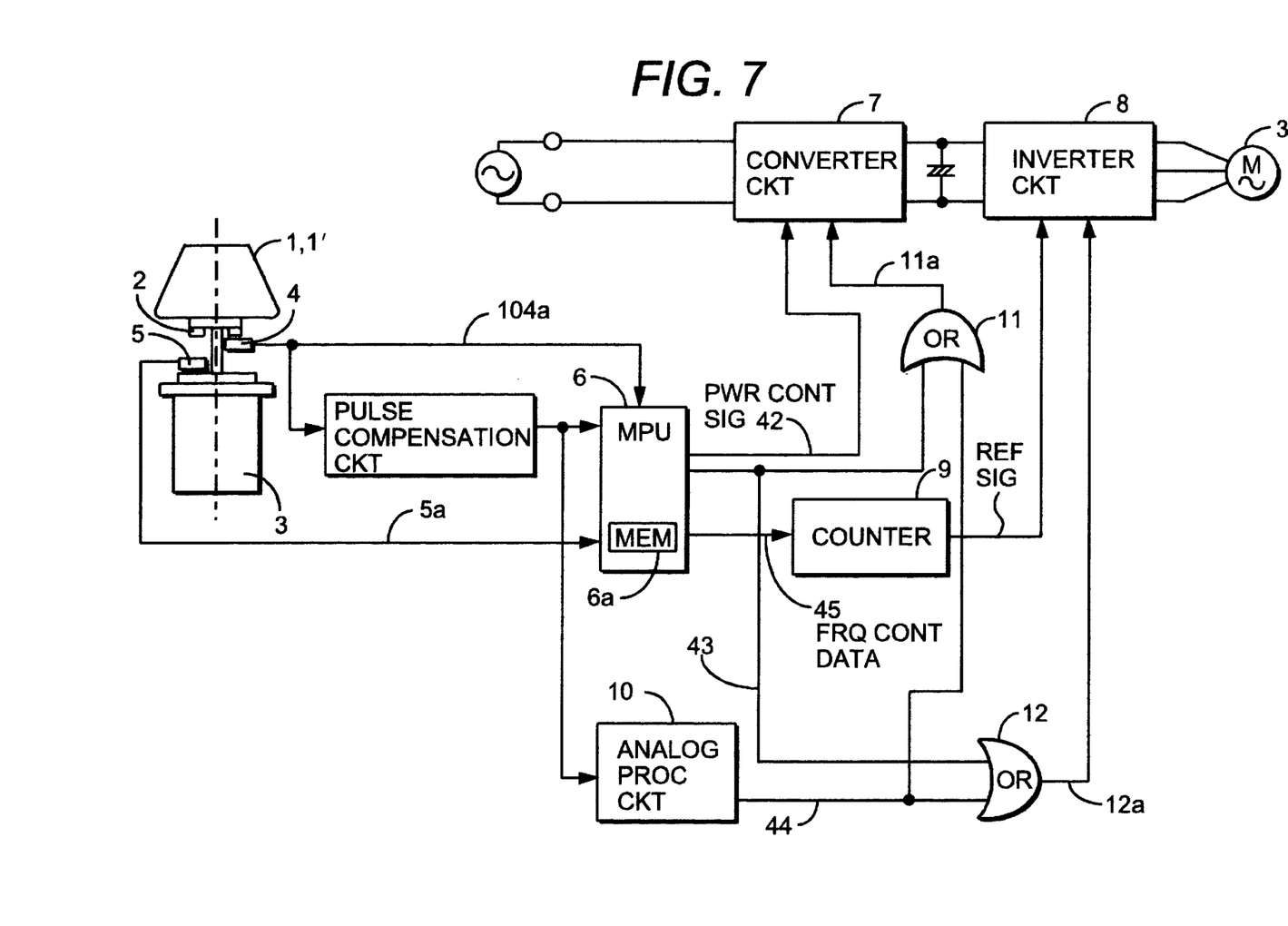
FIG. 7 is a block diagram of a centrifugal apparatus of a second embodiment.

FIG. 7 is a block diagram of a centrifugal apparatus of a second embodiment. The centrifugal apparatus of the second embodiment has the substantially the same structure as that of the first embodiment. The difference is that a disc 2' provided to the rotor 1' is used instead of the rotor 1 having the disc 2 and a pulse-lack compensation circuit 15 is further provided. The disc 2' indicates another type of the rotor 1' is attached to the centrifugal apparatus by the lack of the pulse in the rotor rotating signal in addition to generating the rotor rotation signal. The microprocessor 6 detects this and effects controlling in accordance with the types of the rotor 1'. For example, the life of the rotor 1' is controlled by the microprocessor 6. However, it is also possible to attach the rotor 1 having the disc 2 to this centrifugal apparatus of the second embodiment.

Figure 8:
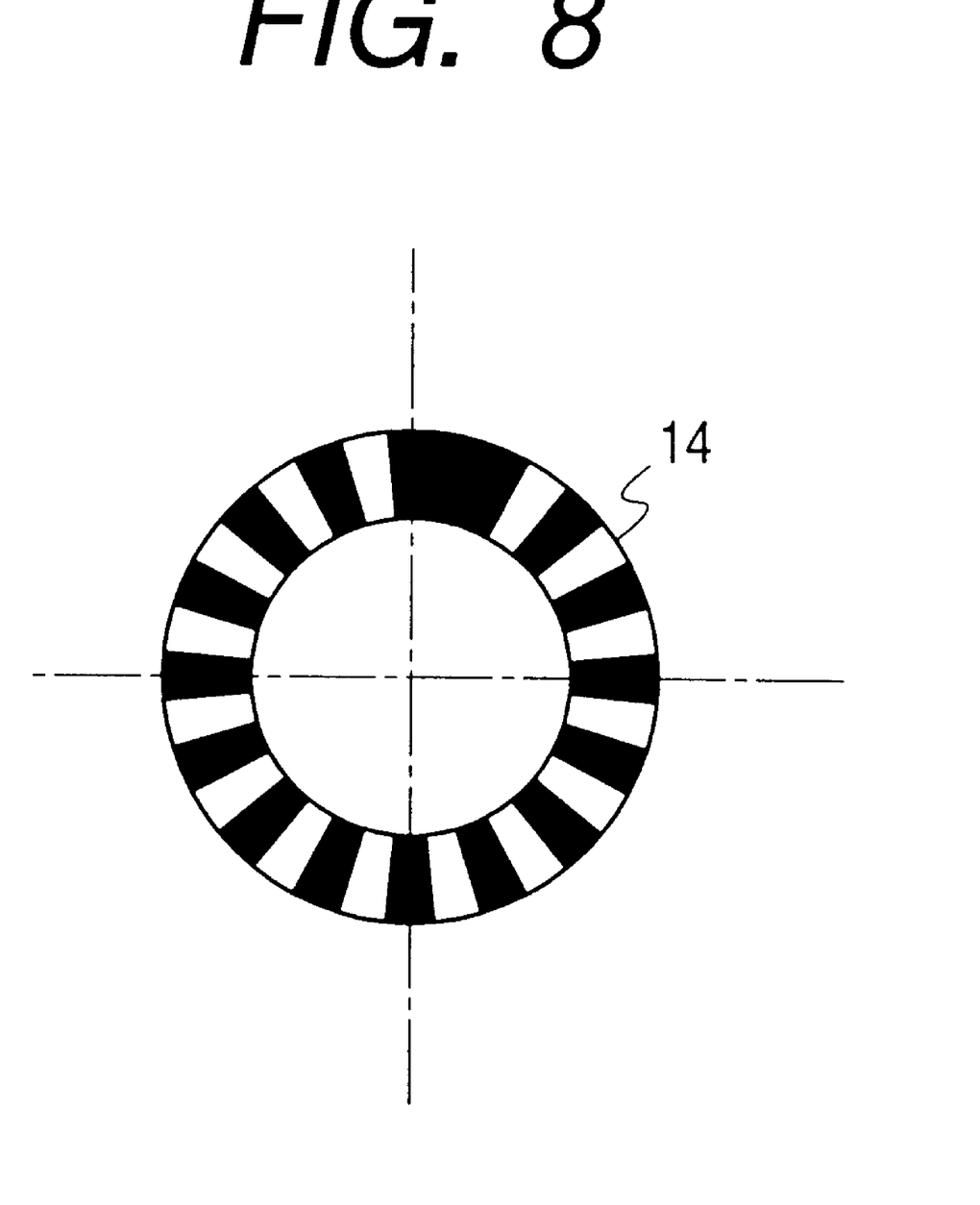
FIG. 8 is a plan view of the disc of the second embodiment.

FIG. 8 is a plan view of the disc 2' of the second embodiment. The disc 2' has another position signal pattern in its circumference direction including the reflective stripes and non-reflective stripes, wherein only one reflective stripe is replaced with the non-reflective stripe. Then, the rotor rotating speed signal lacks a pulse per rotation of the rotor 1'. The pulse-lack compensating circuit 15 detects the lack of the pulse and adds a pulse to the rotor rotation speed signal 104a.

Figure 9:
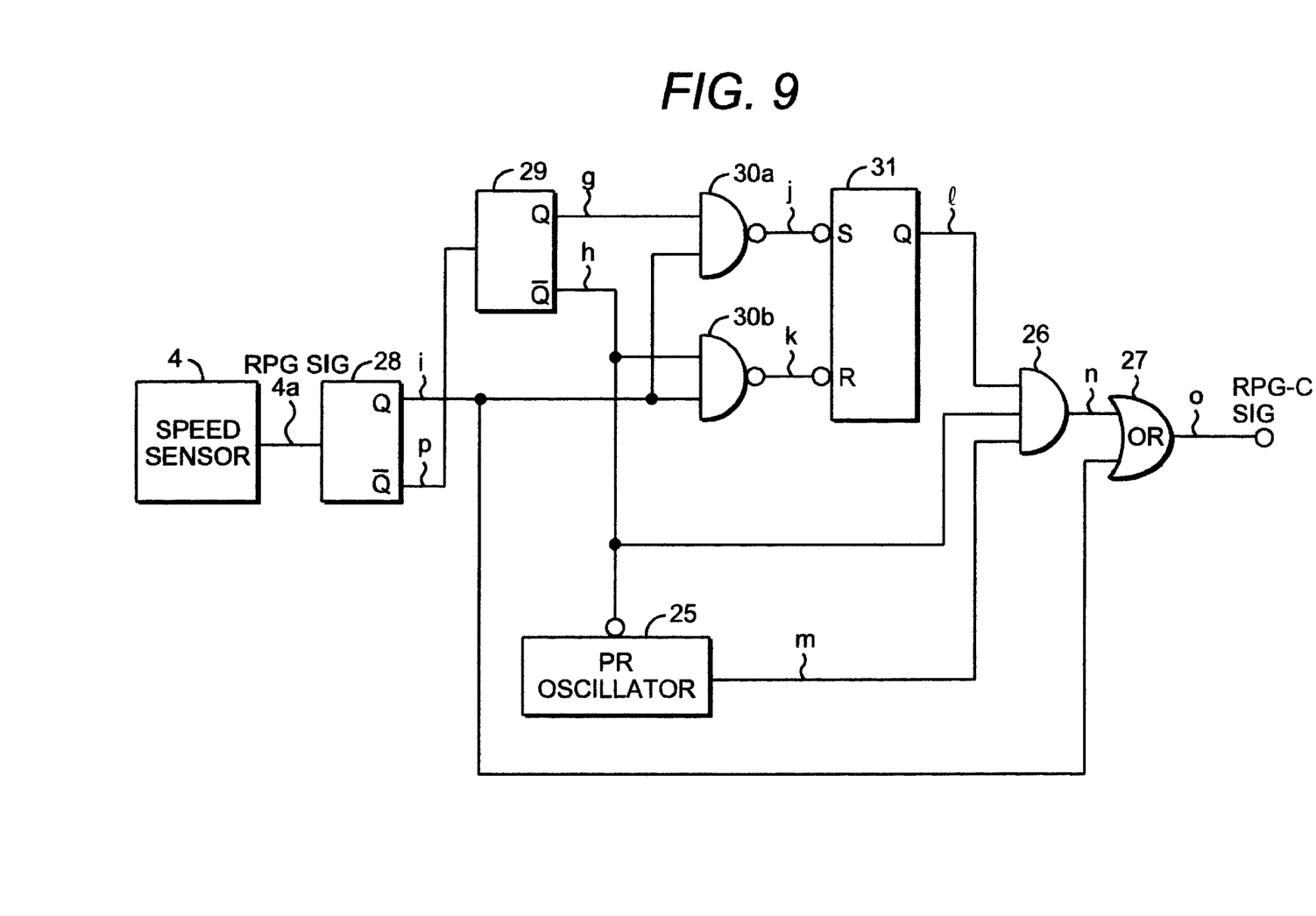
FIG. 9 is a block diagram of the pulse-lack compensation circuit shown in FIG. 7.

FIG. 9 is a block diagram of the pulse-lack compensation circuit 15 of the second embodiment. Figs. 10A to 10J are graphical drawings of the second embodiment, wherein the rotor rotating speed gradually increases and widths of the reflective stripes and the non-reflective stripes are same and uniform except the place where the reflective stripe is replaced with the non-reflective stripe.

The pulse compensation circuit 15 comprises a one-shot multivibrator 28 having Q and $\overline{Q}$ outputs for generating pulse signals i and p in response to the rotor rotating speed signal 104a, a re-triggerable one-shot multivibrator 29 having Q and $\overline{Q}$ outputs for generating pulse signals g and h, a NAND gate 30a responsive to the pulse signals i and g for outputting a pulse signal j, a NAND gate 30b responsive to the pulse signals h and i for outputting a pulse signal k, an RS flip flop having S and R inputs responsive to the pulse signals j and k for outputting a pulse signal l at a Q output, an oscillator 25 having a PR input responsive to the pulse signal h for outputting a pulse signal m, a three-input AND gate 26 responsive to the pulse signals l, h, and m, and an OR gate 27 responsive to the pulse signals n and i for outputting the pulse compensated rotor rotating speed signal (PRG-C).

In this embodiment, it is assumed that the overspeed condition is judged when the frequency of the rotor rotating speed signal exceeds 15.5 KHz if the pulse in the rotor rotating speed signal 104a is not lacked. Then, the lack of the pulse is to be detected from 13.5 KHz to 17.5 KHz. Then, as shown in Fig. 10A to 10J, detecting the lack of the pulse is started after the interval between consecutive two pulses becomes 74 μs, that is, a timing t1.

Figure 10A:
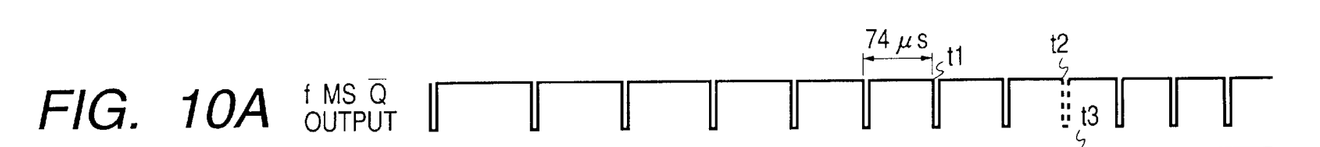
FIGS. 10A to 10J are graphical drawings of the second embodiment.
Figures 10B, 10C, 10D, 10E, 10F:
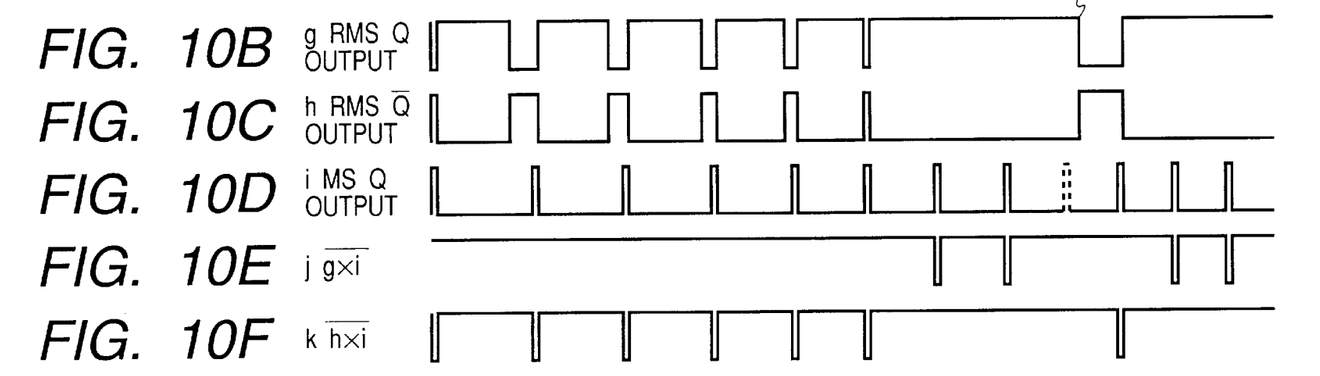
Figures 10G, 10H, 10I:
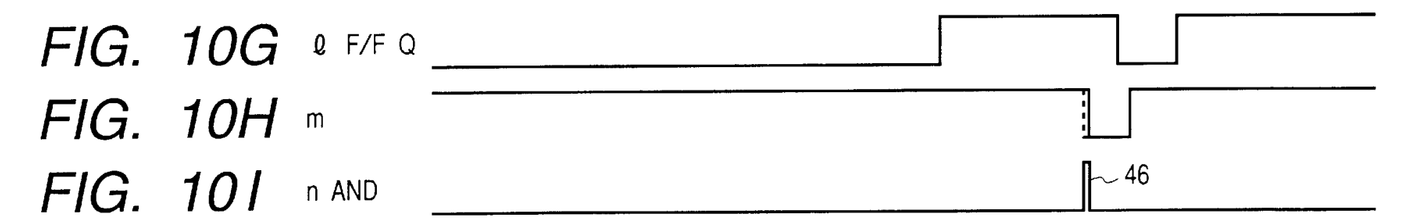
Figure 10J:
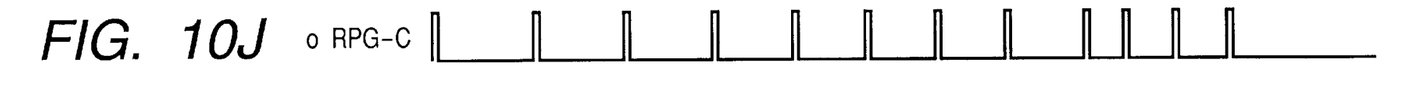

The re-triggerable multivibrator 29 has a duration which is slightly longer than 74 μs. Then, as shown in FIG. 10B, the Q output of the re-triggerable multivibrator 29 remains H after the timing t1 because the re-triggerable multivibrator 29 is re-triggered before its duration expires. However, at timing t2, the re-triggerable multivibrator 29 is not re-triggered because of the lack of the pulse. Then, the re-triggerable multivibrator 29 outputs L at its Q output at timing t3 because the duration from the last pulse expires. This generates the compensation pulse 46 as shown in FIG. 10I using an oscillator 25. An OR gate 27 adds the compensation pulse 45 to the rotor rotating speed signal and outputs a pulse compensated rotor rotating speed signal.

The microprocessor 6 generates the power control signal 42 and the frequency control data 45 to operate the converter circuit 7 and the inverter circuit 8 with the pulse compensated rotor rotation speed signal RPG-C. On the other hand, the microprocessor 6 receives the rotor rotating speed signal 104a directly to detect the lack of the pulse to detect the type of the rotor 1' or 1. When the rotor 1 having the disc 2 is attached to the centrifugal apparatus, the pulse compensation circuit 15 supplies the output of the OR gate 27 which is similar to the rotor rotating speed signal to the microprocessor 6.

What is claimed is:

1. A centrifugal apparatus comprising:
    a rotor for containing a sample;
    a motor coupled to said rotor;
    rotating speed signal generating means for generating a rotating speed signal in accordance with a rotating of said rotor;
    driving means for driving said motor in accordance with said rotating speed signal to a target rotating speed;

a digital processing circuit responsive to said rotating speed signal for Judging whether a rotating speed of said rotor exceeds a first predetermined rotating speed and controlling said driving means to stop rotating said motor when said rotating speed exceeds said first predetermined rotating speed; and an analog processing circuit responsive to said rotating speed signal for Judging whether said rotating speed of said rotor exceeds a second predetermined rotating speed corresponding to said first predetermined rotating speed and controlling said driving means to stop rotating said motor when said rotating speed exceeds said second predetermined rotating speeds wherein said digital processing circuit and said analog processing circuit operate independently of each other.

2. The centrifugal apparatus as claimed in claim 1, wherein said rotating speed signal generating means comprises:

a disc, provided to said rotor, having a position signal pattern in a circumference direction including a plurality of optically alternate stripes; and an optical sensor, arranged to confront said position signal pattern, for detecting optical information from said position signal pattern and generating said rotating speed signal.

3. The centrifugal apparatus as claimed in claim 1, wherein said digital processing circuit comprises a microprocessor for detecting a frequency of said rotating speed signal and Judging said rotating speed by comparing the detected frequency with a predetermined value as said first predetermined rotating speed, and said analog processing circuit comprises:

an analog frequency-to-voltage converting circuit for converting said frequency of said rotating speed signal to a voltage signal, and an analog voltage comparator for comparing said voltage signal with a predetermined voltage as said second predetermined rotating speed.

4. The centrifugal apparatus as claimed in claim 1, further comprising motor rotating speed signal generating means for generating a motor rotating speed signal indicative of a rotating speed of said motors wherein said digital processing circuit further comprises:

first detection means for detecting a first frequency variation of said rotating speed signal per unit interval;

second detection means for detecting a second frequency variation of said motor rotating speed signal per said unit interval; and difference detection means for detecting a difference between said first and second frequency variations; and control means responsive to said difference detection means for controlling said driving means to stop rotating said motor when said difference exceeds a reference.

5. The centrifugal apparatus as claimed in claim 1, further comprising motor rotating speed signal generating means for generating a motor rotating speed signal indicative of a rotating speed of said motor, wherein said digital processing circuit further comprises:

first detection means for detecting a cycle variation of said rotating speed signal;

second detection means for detecting a second cycle variation of said motor rotating speed signal; and difference detection means for detecting a difference between said first and second cycle variations; and control means responsive to said difference detection means for controlling said driving means to stop rotating said motor when said difference exceeds a reference.

* * * * *